United States Patent

Wong et al.

Patent Number: 5,818,806
Date of Patent: Oct. 6, 1998

[54] METHOD AND APPARATUS FOR PROVIDING EQUALIZATION FOR THE READING OF MARKS ON OPTICAL DATA STORAGE MEDIA

[75] Inventors: Terrence L. Wong, San Francisco; Steven R. Spielman, Berkeley, both of Calif.

[73] Assignee: Calimetrics, Inc., Emeryville, Calif.

[21] Appl. No.: 852,242

[22] Filed: May 6, 1997

Related U.S. Application Data

[63] Continuation-in-part of Ser. No. 593,651, Jan. 29, 1996, and Ser. No. 620,196, Mar. 22, 1996, abandoned.

[51] Int. Cl.$^6$ .................................................. G11B 7/00
[52] U.S. Cl. .................. 369/59; 369/58; 369/47; 369/275.3; 360/53; 375/348; 375/341; 375/262
[58] Field of Search .................. 369/59, 42, 48, 369/49, 50, 54, 58, 60, 32, 124, 275.3; 360/48, 51, 53, 39; 375/262, 341, 348, 229

[56] References Cited

U.S. PATENT DOCUMENTS

| | | | |
|---|---|---|---|
| 4,150,398 | 4/1979 | Kojima et al. | . |
| 4,629,668 | 12/1986 | Hamersley et al. | . |
| 5,045,438 | 9/1991 | Adachi | . |
| 5,084,858 | 1/1992 | Maeda | . |
| 5,181,161 | 1/1993 | Hirose et al. | . |
| 5,206,853 | 4/1993 | Tanaka | . |
| 5,280,466 | 1/1994 | Tomita | . |
| 5,418,660 | 5/1995 | Sato et al. | 360/65 |
| 5,469,415 | 11/1995 | Fujita et al. | 369/59 X |
| 5,539,588 | 7/1996 | Sawaguchi et al. | 360/46 |
| 5,563,864 | 10/1996 | Koboyashi et al. | 369/59 |
| 5,568,456 | 10/1996 | Hayashi et al. | . |
| 5,586,100 | 12/1996 | Lee et al. | 369/59 X |
| 5,606,538 | 2/1997 | Maruno et al. | . |
| 5,623,474 | 4/1997 | Oshio et al. | . |
| 5,625,632 | 4/1997 | Ishida et al. | 371/40.14 |

FOREIGN PATENT DOCUMENTS 3-141031  6/1991  Japan .

OTHER PUBLICATIONS

Elliott, David, J., Integrated Circuit Fabrication Technology, 1982, pp. 209–225.

*Primary Examiner*—Muhammad N. Edun
*Attorney, Agent, or Firm*—Beyer & Weaver, LLP

[57] ABSTRACT

A system and method are disclosed for compensating for intersymbol interference on an optical disc. The method includes measuring an intersymbol linear transfer function. The intersymbol linear transfer function substantially describes a linear portion of the effect of intersymbol interference on an optically detected read signal from an optical disc. The intersymbol linear transfer function is convolved with a write signal to produce a linearly transformed portion of the optically detected read signal. An inverse linear transfer function of the intersymbol linear transfer function is determined. The inverse linear transfer function has the property of canceling the effect of convolving the intersymbol linear transfer function with the write signal. The optically detected read signal is convolved with the inverse linear transfer function. Thus, the linear portion of the effect of intersymbol interference on an optically detected read signal from an optical disc is canceled by the convolution of the optically detected read signal with the inverse linear transfer function.

31 Claims, 2 Drawing Sheets

METHOD AND APPARATUS FOR PROVIDING EQUALIZATION FOR THE READING OF MARKS ON OPTICAL DATA STORAGE MEDIA

CROSS REFERENCE TO RELATED APPLICATIONS

This application is a continuation in part of application Ser. Nos. 08/593,651 filed Jan. 29, 1996 and 08/620,196 filed Mar. 22, 1996, abandoned, which are incorporated herein by reference for all purposes.

BACKGROUND OF THE INVENTION

1. Field of the Invention

The present invention relates generally to a method and apparatus for providing equalization for the reading of marks on optical data storage media. More specifically, the invention relates to a method and apparatus for changing the depth of marks made in optical storage media and for signal processing to compensate for intersymbol interference between the marks.

2. Description of the Related Art

Current Optical data storage discs store data in the form of pits which are formed at the surface of the disc. The depth of the pits is approximately a quarter of a wavelength so that light reflecting off of the bottom of a pit interferes with the surrounding land to create a dark spot. U.S. application Ser. No. 08/620,196 previously incorporated by reference and U.S. Pat. No. 5,235,857 which is herein incorporated by reference for all purposes describe an optical disc which stores more than one bit of information at each pit or symbol location by modulating the depth of the pits. Such a disc is referred to as a pit depth modulated (PDM) disc. Light reflected from one pit also tends to interfere with light reflected from another pit, especially when the pits are smaller than the reading laser spot of the optic stylus, resulting in intersymbol interference. The depth and location of one pit or symbol, therefore, tends to influence or interfere with the signal that is read from adjacent or neighboring symbols. The effect of the interference is greater when the symbols are closer together. As the spatial frequency of the pits increases, (as it must when more pits are included in a given area to increase data storage density), the intersymbol interference effect increases. A "modulation transfer function" (MTF) describes the transformation of the detected signal that results from the diffraction of light from neighboring pits.

Optical data disc readers currently use analog filtering of the detector signal to equalize the frequency response of the system. The equalization is an attempt to compensate for the MTF, which predicts how much contrast an optical imaging system will generate when scanning different spatial frequencies. Current art uses a simple frequency equalization as discussed in chapter 2 of Principles of Optical Disc Systems (Bouwhuis, Braat, Huijser, Pasman, van Rosmalen, and Immink, 1985, Adam Hilger Ltd., Boston, Mass.) which is herein incorporated by reference for all purposes.

Generally, the magnitude of the MTF decreases monotonically with increasing spatial frequency, reaching zero at a limit called the optical cutoff frequency. For example, the peak-to-peak signal from a series of 0.83 $\mu$m pits and lands on a CD is approximately 40% that from 1.6 $\mu$m marks. Above the cutoff frequency, which for CD corresponds to 0.43 $\mu$m pits and lands, a CD reader would detect no contrast at all. Since the shorter marks correspond to higher temporal frequencies in the detector signal, one can "equalize" the contrasts of long and short marks by increasing the high-frequency gain in the electronics.

Current analog equalization filters are a limited solution for three reasons. First, it is difficult to build a filter which accurately inverts the MTF over a wide frequency range. Second, optical disc reading systems are nonlinear, and there is a complex interaction between the reading spot of the optical stylus and the pits or marks on an optical disc. Third, because such an analog filter cannot be adjusted, the linear velocity of the disc must remain fixed. This is because the filter reacts to the timing of the electrical signal whereas the ISI really is a function of distance along the track. If the linear velocity is not constant, then the relationship between spatial frequency and temporal frequency changes. Consequently, CD's and DVD's are constant linear velocity (CLV) systems. CLV is inconvenient for data storage because the spindle speed must be adjusted each time the drive seeks data at a different disc radius. When the reader head seeks information at a different radius, the drive must wait for the spindle to change rotational speed to maintain the linear velocity. Certain magneto-optical drives use analog equalization filters and operate at CAV. This is accomplished by dividing the disc radially into several zones, each with its own data rate and equalization filter. The zones must be narrow enough so that the change in linear velocity is small enough over a single zone so that one filter can operate over an entire zone even though the linear velocity is changing.

To maximize the information density on an optical disc, the symbols are made as short as possible, leading to increased inter-symbol interference. ISI limits the capacity of conventional binary discs (CD, DVD) and is particularly harmful to the signal from a PDM disc with multi-level marks. If ISI could be removed more effectively than analog equalization techniques, smaller symbols could be used and higher capacity and transfer rates could be achieved.

In view of the foregoing, there is a need for methods and apparatuses for providing better equalization filters than those that are currently available. Specifically, it would be desirable if equalization filters could be developed which could adapt to different linear speeds so that nonconstant linear velocity disc drive systems could be used. In addition, there is a need for methods and apparatuses for precompensating for the linear, nonlinear, and other effects which are caused by pit modulation.

SUMMARY OF THE INVENTION

Accordingly, the present invention provides methods and apparatuses for providing digital equalization filters that more accurately invert the MTF and that can adapt to nonconstant linear velocities. Methods and apparatuses for compensating for the nonlinear effects which are caused by pit modulation are also disclosed. It should be appreciated that the present invention can be implemented in numerous ways, including as a process, an apparatus, a system, a device, a method, or a computer readable medium. Several inventive embodiments of the present invention are described below.

In one embodiment, a method of compensating for intersymbol interference on an optical disc is provided. The method includes measuring an intersymbol linear transfer function. The intersymbol linear transfer function substantially describes a linear portion of the effect of intersymbol interference on an optically detected read signal from an optical disc. The intersymbol linear transfer function is convolved with a write signal to produce a linearly transformed portion of the optically detected read signal. An inverse linear transfer function of the intersymbol linear transfer function is determined. The inverse linear transfer function has the property of canceling the effect of convolving the intersymbol linear transfer function with the write signal. The optically detected read signal is convolved with the inverse linear transfer function. Thus, the linear portion of the effect of intersymbol interference on an optically detected read signal from an optical disc is canceled by the convolution of the optically detected read signal with the inverse linear transfer function.

In another embodiment, a method of compensating for intersymbol interference is disclosed that includes measuring an intersymbol linear transfer function that substantially describes the linear portion of the effect of intersymbol interference on an optically detected read signal from an optical disc. The intersymbol linear transfer function is convolved with a write signal to produce a linearly transformed portion of the optically detected read signal. An inverse linear transfer function of the intersymbol linear transfer function is determined. The inverse linear transfer function has the property of canceling the effect of convolving the intersymbol linear transfer function with the write signal. The inverse linear transfer function is divided into a short portion and a long portion. The write signal is convolved with a precompensation transfer function and the precompensation transfer function is substantially the inverse of the long portion of the inverse linear transfer function. The optically detected read signal is convolved with the short portion of the inverse linear transfer function so that the linear portion of the effect of intersymbol interference on an optically detected read signal from an optical disc is canceled.

In another embodiment, a method of compensating for intersymbol interference on an optical disc is disclosed that includes measuring an intersymbol nonlinear transfer function. The intersymbol nonlinear transfer function substantially describes the nonlinear portion of the effect of intersymbol interference on an optically detected read signal from an optical disc. The intersymbol nonlinear transfer function is nonlinearly convolved with a write signal to produce a nonlinearly transformed portion of the optically detected read signal. An inverse nonlinear transfer function of the intersymbol nonlinear transfer function is determined. The inverse nonlinear transfer function has the property of canceling the effect of nonlinearly convolving the intersymbol nonlinear transfer function with the write signal. The write signal is nonlinearly convolved with a precompensation transfer function and the precompensation transfer function is substantially the same as the inverse nonlinear transfer function so that the nonlinear portion of the effect of intersymbol interference on an optically detected read signal from an optical disc is canceled.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one embodiment, the present invention attacks the problem of reversing the effects of interference in two ways. First, to accurately cancel out linear effects, sophisticated filters for inverting the MTF are created using a digital signal processor (DSP). A DSP filter works by sampling and digitizing the signal at some rate and then mathematically convolving the signal data with a set of fixed coefficients. By choosing the coefficients, one can produce a filter with any desired frequency response, up to the Nyquist limit of ½ the sampling frequency. Second, a nonlinear mathematical algorithm is used to cancel out nonlinear intersymbol interference effects.

By using a DSP filter instead of an analog filter, the storage capacity of an optical disc system is improved in two ways. First, because a DSP filter will work over a wider frequency range, it is possible to operate closer to the cutoff frequency (i.e. use shorter marks). Second, the higher quality equalization allows for the decoding of multi-level marks, which requires better recovery of signal amplitudes than the decoding of binary marks. The speed of data recovery can also be improved since the DSP filter may be adjusted to work with a nonconstant velocity optical disc driver, eliminating the need to adjust the linear speed of the disc when different areas are accessed. Data recovery is further improved by removing nonlinear inter-symbol interference effects from the reader signal. The nonlinear techniques, which work in conjunction with DSP, are applied either as an extra signal processing step or as precompensation before the data is written. It is also possible, using precompensation that compensates for nonlinear and some linear effects, to simplify the DSP filter or to use an analog filter for the remaining linear effects.

Data is encoded as a groove of varying depth on the surface of a reflective disc. The data is first expressed as a series of multi-level symbols $x_i$. Then, within the limits of the mastering and replication process, each symbol is converted into a segment of a groove with constant depth. These segments, called "pits", all have the same length. Although the term "pit" is used throughout this specification to refer to an area on the disc which represents a data symbol it should be noted that this invention is specifically not restricted to this particular surface morphology. A "pit" can be considered to be any type of multi-level mark, for example an area whose reflectivity has been modified by some sort of writing process or a mark with different possible widths.

Figure 1:
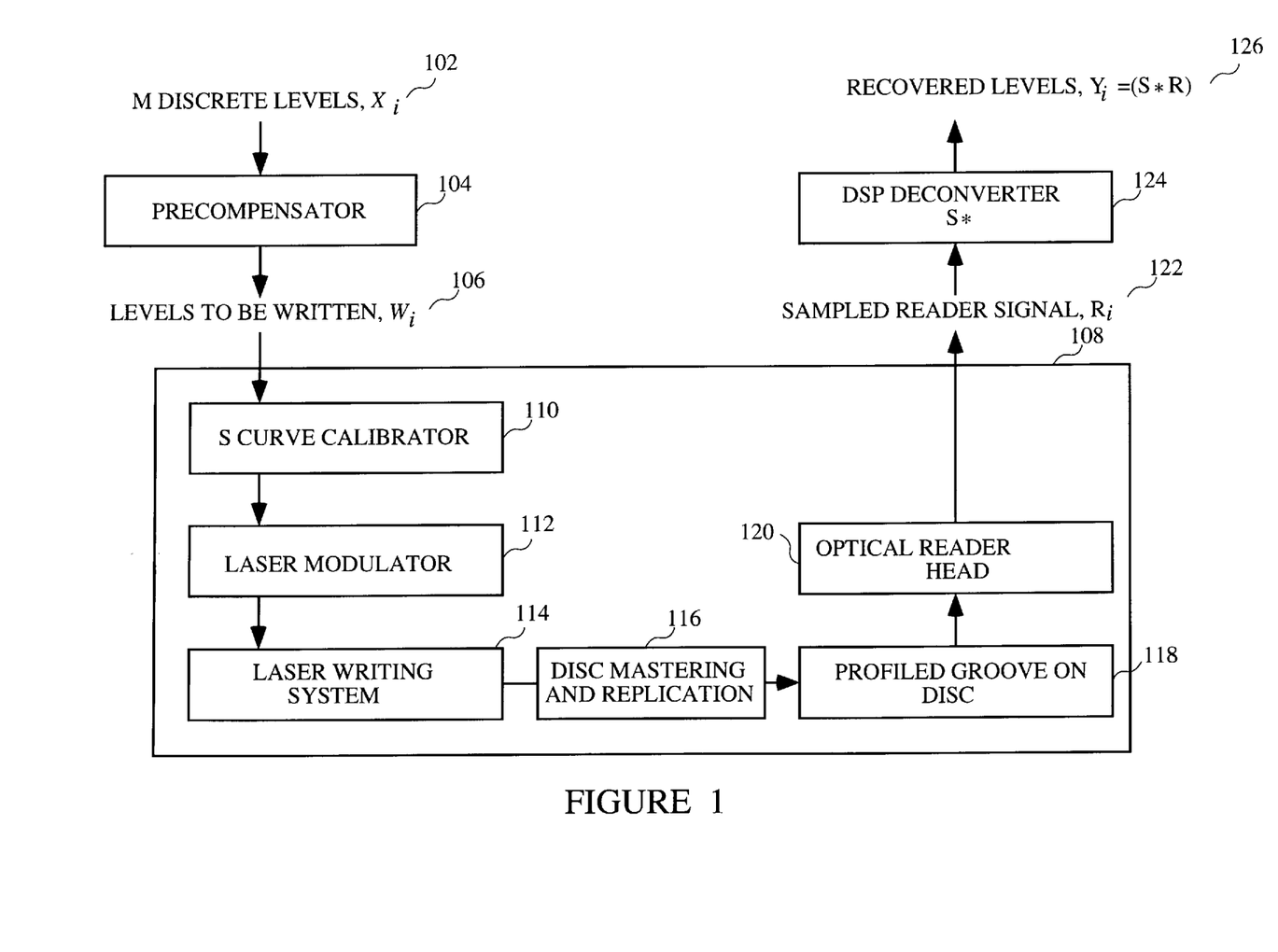
FIG. 1 is a block diagram which illustrates an optical data storage and data recovery system.

FIG. 1 is a block diagram which illustrates an optical data storage and data recovery system. A data signal 102 includes a sequence of symbols $x_i$ received from the modulation encoder. The value of each $x_i$ is one of M possible levels, so that a level is a real number denoting the value of a data symbol. Data signal 102 is fed to a precompensator 104 which precompensates the signal to help remove nonlinear intersymbol interference effects, and possibly some linear effects. The output of precompensator 104 is a signal 106 which represents the sequence of levels to be written $w_i$. The levels to be written $w_i$ represent the precompensated levels which are to be written to the disc. These levels are not necessarily discrete.

Signal 106 is input to an Optical Disc Data Channel (ODDC) 108. ODDC 108 represents all steps in the process from disc mastering to reading which affect the data sequence that is recovered. Within ODDC 108, signal 106 is first transformed by an S-curve calibrator 110 which compensates for the responsiveness of the writeable disc medium to laser intensity. A one-to-one mapping converts each level $w_i$ into the appropriate modulation signal for the mastering laser, taking into account the nonlinear response of all elements in the ODDC. S-curve calibrator 110 is designed so that if $w_i$ is written to the disc as a very long pit, then $r_i=w_i$. The output of S-curve calibrator 110 is sent to a laser modulator 112 which controls a laser writing system 114.

The master disc which is produced by a laser writing system 114 undergoes disc mastering and replication 116 and a resulting profiled groove on the disc 118 represents the final optical storage form of the original data signal. An optical reader head 120 (for example a CD or DVD reader head) reads the disc and outputs a sampled reader signal 122, which is denoted $r_i$. Reader signal 122 is input to a DSP deconvolver 124 which compensates for the MTF. Finally, the recovered levels 126, denoted as $y_i$, are obtained. Recovered levels 126 are the convolution of s, the transfer function of the deconvolver, and $r_i$. Once the deconvolution is completed, except for noise and imperfections in the signal processing, $y_i$ should equal the original data $x_i$. These values are passed on to the modulation decoder.

The precompensation and deconvolution steps implemented on precompensator 104 and DSP deconvolver 124 cancel out the Intersymbol Interference (ISI) from the Optical Disc Data Channel (ODDC), enabling successful recovery of the data. Precompensator 104 compensates for the nonlinear ISI effects and DSP deconvolver 124 compensates for the linear effects. Nonlinear effects are removed in the current preferred embodiment by precompensation to avoid the processing requirements of removing nonlinear ISI effects from the sampled reader signal, $r_i$. In other embodiments, nonlinear effects are removed after $r_i$, is read.

In one embodiment, the design of precompensator 104 and DSP deconvolver 124 is based on a simulation of how the ODDC affects a sequence of symbols. The process of reading a disc was simulated using a model based on Fraunhofer diffraction theory. Such a simulation shows the inherent nonlinearity in the ODDC.

In one model, the data was encoded as a simple rectangular groove having a depth which changes at the start of new pits. The depths were chosen so as to produce evenly spaced signals when "read" by a simulated disc player. When the pits were shortened to as small as 0.5 μm the simulated reader signal exhibited ISI as expected.

Figure 2:
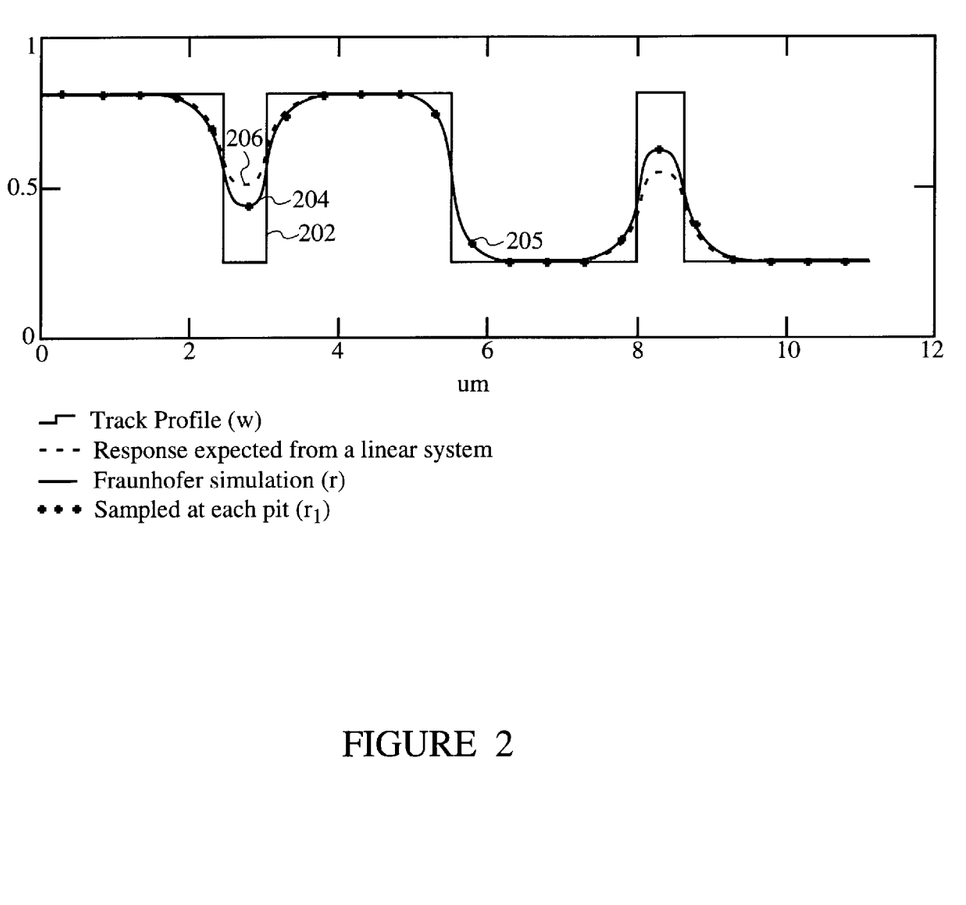
FIG. 2 is a graph which illustrates Fraunhofer diffraction results for 0.5 µm length pits on a 0.5 µm wide track.

FIG. 2 is a graph which illustrates Fraunhofer diffraction results for 0.5 μm length pits on a 0.5 μm wide track. On the vertical axis, 1.0 represents the signal level from a flat area on the disc, and 0.0 represents zero reflected intensity. A curve 202 represents the track depth profile on the disc. A curve 204 represents a Fraunhofer simulation of the signal read by the optical disc reader. A set of samples 205 represent samples of curve 204 taken at various pit locations. A curve 206 represents the signal that would be expected from a linear system.

The dependence of the contrast of the signal on the spatial frequency is evident from FIG. 2 on both curve 204 and 206. In the region between about 3 and 4 μm, the spatial frequency is relatively high and the contrast in the signal is reduced. In the region between about 3 and 8 μm, the spatial frequency is relatively low and the contrast in the signal is at a maximum. In the region just past 8 μm, the spatial frequency is again higher and the contrast is lower.

As noted above, so long as a constant linear speed drive is used to read the disc, the spatial frequency maps to a temporal frequency in the read signal. A filter with an increased gain at higher frequencies could therefore compensate for the effect described above. However, when the linear speed of the reader head varies relative to the disc surface, as it would if a constant angular velocity (CAV) drive were used, then the spatial frequency would not map to the temporal frequency of the read signal. In certain embodiments, the present invention provides a digital filter which compensates for changing linear speeds to effectively filter the signal and remove linear ISI effects. The frequency response of a DSP filter is referenced to the data sampling clock, which by design is marking off specific distances on the disc. Such a filter could therefore remove ISI equally well at any linear velocity. It would therefore be possible to read a disc at CAV, reducing seek times.

As seen in FIG. 2, the ISI has an unusual character. A deep mark amongst shallow neighbors produces a signal with a different shape than that from a shallow mark amongst deep neighbors. In other words, there is not a single impulse response function as there is in the linear system shown for comparison.

To better understand the origin and mathematical form of the nonlinear ISI, a simple local-interference model which could be solved analytically was used. In this picture, the reader signal arises from destructive interference between the light reflecting off the groove and light that reflects off the adjacent land between tracks. The electric field returning from a spot centered over the jth pit is given by:

$E_j$=field from adjacent land+field from groove $$E_j = \frac{1}{2} + \frac{1}{2} \sum_{k=-n}^{+n} a_k e^{i\phi_{j-k}}$$

where $\phi_j$ is the phase shift due to the depth of pit j, and $a_k$ is a finite sequence representing how the beam is distributed on the neighboring pits. If one identifies $r_i$ as the intensity $|E_i|^2$, and $w_i$ as the quantity ½(1+cos$\phi_i$)—the "S-curve" in this case—one can show that:

$$r_i = \sum_j a_j w_{i-j} - \qquad (1)$$

$$\frac{1}{2} \sum_{j,k} a_j a_k \sin^2\left(\frac{\sin^{-1}(2w_{i-j}-1) - \sin^{-1}(2w_{i-k}-1)}{2}\right)$$

$$\approx \sum_j a_j w_{i-j} - \frac{1}{2} \sum_{j,k} a_j a_k (w_{i-j} - w_{i-k})^2 + \theta(2w_i - 1)^4$$

The sequence $a_j$ can now be interpreted as a set of (linear) convolution coefficients. (The MTF and $a_j$ are completely equivalent descriptions of the linear impulse response of the ODDC.) The second term is the nonlinear ISI and arises not from destructive interference between pit and land, but between pit and adjacent or nearby neighboring pit. It acts to lower the reader signal, consistent with FIG. 2. The third term represents the remainder of the expansion of the $\sin^2$ term in the equation above.

In certain embodiments, both real data and Fraunhofer diffraction simulations can be better modeled by an expression which is more general than Eq. (1):

$$r_i = \sum_j a_j w_{i-j} - \sum_{j,k} B_{jk} w_{i-j} w_{i-k} \quad (2)$$

If the nearby symbols $w_{i\pm1}$, $w_{i\pm2}$, etc. differ from $w_i$ then the value of $r_i$ differs from $w_i$ and there is ISI. If all $w_i$ in the vicinity are identical then there is no ISI and $r_i=w_i$. To conform to this definition of ISI, the elements $a_j$ sum to unity and the elements $B_{jk}$ sum to zero. The coefficients $a_j$ and $B_{jk}$ (j,k=−2 . . . +2, typically) are optimized using a least-squares method to make Eq. (2) match real reader data. Eq. (2) can be written concisely as $$r = a*w - B \bullet w, \quad (3)$$

where r and w now represent the entire sequences, rather than just the ith element as before. The term a*w (the first sum in Eq. (2)) is referred to as a linear convolution, and B●w (the second sum) is called a "nonlinear convolution." The analysis presented here does not depend on the form of the nonlinear convolution. Different formulas which are developed can be implemented by redefining "●" in the equations that follow. In one preferred embodiment, the form of the nonlinear convolution term, or second sum, is:

$$\sum_{j,k} B_{jk}(w_{i-j} - w_{i-k})^2 \cdot [1 + G \cdot (w_{i-j} + w_{i-k}) +$$

$$H \cdot (w_{i-j} + w_{i-k})^2 + P \cdot (w_{i-j} - w_{i-k})^2]$$

where G, H, P are optimized in the same way as $B_{jk}$.

The linear part of Eq. (3) is invertible. As long as the ISI is not too severe, one can calculate a sequence of coefficients $a^{-1}$ such that $a^{-1}*(a*w)=w$. Since a can be physically measured or measured using a computer simulation, $a^{-1}$ can be derived from the physical measurements of a. In one embodiment, the reader is preprogrammed with the coefficients of a. In other embodiments, the coefficients of a could be determined by the reader's response to a test pattern on the disc. Likewise, B can also be physically measured. In the fitting process, the B●w form can not produce effects similar to a*w; thus they can be fit separately. B, however, is more difficult to invert. The following discussion shows the nonlinear term B is dealt with in one embodiment using an iterative data recovery method.

In one embodiment, a system is designed with no precompensation ($w_i=x_i$). One example of a post-processing method for such a system which inverts Eq. (3) and recovers the data $w_i$ from the sequence of reader samples $r_i$, is the following iteration, where successive approximations of the sequence w are calculated:

$$w^{(0)} = a^{-1}*r \quad (4)$$
$$w^{(1)} = a^{-1}*r + a^{-1}*(B \cdot w^{(0)})$$
$$\vdots$$
$$w^{(n)} = a^{-1}*r + a^{-1}*(B \cdot w^{(n-1)}) \text{ until } w^{(n)} \approx w^{(n-1)}$$

To verify that $w^{(n)}$ does represent recovered data, one can apply the a* operation to both sides of the last line. After rearranging terms, one obtains the expression $$r = a*w^{(n)} - B \cdot w^{(n-1)} \quad (5)$$
$$\approx a*w^{(n)} - B \cdot w^{(n)}$$

showing that $w^{(n)}$ does satisfy Eq. (3). While this process has been shown to work, the post-processing power required to perform the iterations would need to be included in every disc reader. If the computing power required to perform the iteration is large, it may prove advantageous to do this work as a precompensation.

For this reason, in certain embodiments, a precompensation method is used so that the iteration may be performed once, before the data is sent through the ODDC, simplifying the design of the disc player. In such embodiments, rather than a data recovery method, Eq. (4) is instead interpreted as the precompensation step. If it is specified what the reader signal r should be, then $w^{(n)}$ is the sequence that must be fed to the ODDC in order to achieve that output. If r is constrained to be equal to the original data sequence x, then Eq. (4) represents an algorithm which completely precompensates the data for all ISI. If precompensation is performed according to this constraint, then the sequence r can be passed on to the modulation decoder with no further processing.

In some embodiments, complete precompensation (r=x) may harm the signal to noise ratio, depending on how noise enters the system. In a situation where noise is filtered by the ODDC in the same way as w, it turns out to be unfavorable to amplify some frequency components of x over others, as $a^{-1}$ does. Doing so only forces one to confine the original M discrete levels to a smaller dynamic range to ensure that w never exceeds the dynamic range of the ODDC.

Therefore, from a noise perspective, it is preferable to do the equalization after the ODDC, whereas from a system design view, one may wish to minimize the number of deconvolution coefficients required for post-processing. Fortunately it is possible to compromise by splitting $a^{-1}$ into two parts: a short set of coefficients s can provide the coarse frequency response during post-processing, and a long set $(s*a)^{-1}$ can fine tune the signal at the precompensation step. Since r can be chosen in Eq.(4), it can be required that:

$$s*r=x \quad (6)$$

The levels that need to be written to disc can be calculated with the following iteration:

$$w^{(0)} = (s*a)^{-1}*x \quad (7)$$
$$w^{(1)} = (s*a)^{-1}*x + a^{-1}*(B \cdot w^{(0)})$$
$$\vdots$$
$$w^{(n)} = (s*a)^{-1}*x + a^{-1}*(B \cdot w^{(n-1)}) \text{ until } w^{(n)} \approx w^{(n-1)}$$

When the iteration converges, a sequence w ($=w^{(n)} \approx w^{(n-1)}$) has been found which satisfies the equation:

$$w=(s*a)^{-1}*x+a^{-1}*(B \bullet w) \quad (8)$$

from which it follows that $$(s*a)*w = (s*a)*((s*a)^{-1}*x + a^{-1}*(B \cdot w)) \quad (9)$$
$$s*(a*w) = x + s*(B \cdot w)$$
$$s*(a*w - B \cdot w) = x$$
$$s*r = x$$

In principle, there is no restriction on choosing the deconvolution coefficients s. It is possible to choose to do no precompensation of the linear part by setting $s=a^{-1}$, thus requiring the DSP to use a long set of coefficients. Complete precompensation would correspond to $s=(\ldots 0\ 0\ 1\ 0\ 0\ \ldots)$. In one embodiment, a 10% fluctuation due to precompensation is preferred, decreasing the available dynamic range by approximately 10%. It is preferable that the precompensation gain change over its frequency range by a total of less than 20%. A change of less than 10% is more preferred, and a change of less than 5% is most preferred.

Thus, a method of compensating for both linear and nonlinear intersymbol interference effects has been described. Precompensation is shown for the nonlinear effects and for portions of the linear effects which would require a large amount of computational resources to deal with on the reader side.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. For example, although an optical data storage system has been described, the techniques described above could also be useful in data storage or communications systems in general. If the ODDC is replaced by a cable or wireless transmission system, the above described methods are still applicable. Although the problem of nonlinear ISI has been described in detail, even a linear system can benefit from the careful distribution of the equalization between precompensation and post-processing steps. Accordingly, the present embodiments are to be considered as illustrative and not restrictive, and the invention is not to be limited to the details given herein, but may be modified within the scope and equivalents of the appended claims.

What is claimed is:

1. A method of compensating for intersymbol interference on an optical disc comprising:

measuring an intersymbol linear transfer function, said intersymbol linear transfer function substantially describing a linear portion of the effect of intersymbol interference on an optically detected read signal from an optical disc, said intersymbol linear transfer function being convolved with a write signal to produce a linearly transformed portion of the optically detected read signal;

determining an inverse linear transfer function of the intersymbol linear transfer function, said inverse linear transfer function having the property of canceling the effect of convolving the intersymbol linear transfer function with the write signal; and convolving the optically detected read signal with the inverse linear transfer function;

whereby the linear portion of the effect of intersymbol interference on an optically detected read signal from an optical disc is canceled by the convolution of the optically detected read signal with the inverse linear transfer function.

2. A method as recited in claim 1 wherein convolving the optically detected read signal with the inverse linear transfer function further includes inputting the optically detected read signal to a DSP filter having a transfer function which is substantially the inverse linear transfer function.

3. A method as recited in claim 2 further including referencing the frequency response of the DSP filter to the data sampling clock.

4. A method as recited in claim 3 wherein the optically detected read signal is obtained by sampling the disc at a constant angular velocity.

5. A method as recited in claim 2 as applied to a pit depth modulated optical disc system.

6. A method as recited in claim 1 wherein convolving the optically detected read signal with the inverse linear transfer function further includes inputting the optically detected read signal to a neural network filter having a transfer function which is substantially the inverse linear transfer function.

7. A method as recited in claim 6 further including referencing the frequency response of the neural network filter to the data sampling clock.

8. A method as recited in claim 6 wherein the optically detected read signal is obtained by sampling the disc at a constant angular velocity.

9. A method as recited in claim 1 further including using a Viterbi decoder to determine the maximum likelihood stored signal given the optically detected read signal.

10. A method as recited in claim 1 wherein the optically detected read signal is obtained by sampling the disc at a constant angular velocity.

11. A method as recited in claim 1 as applied to a pit depth modulated optical disc system.

12. A method as recited in claim 1 as applied to a CD optical disc system.

13. A method as recited in claim 1 as applied to a DVD optical disc system.

14. A method as recited in claim 1 as applied to an MO optical disc system.

15. A method as recited in claim 1 as applied to an optical disc system that is a phase change system.

16. A method of compensating for intersymbol interference on an optical disc comprising:

measuring an intersymbol linear transfer function, said intersymbol linear transfer function substantially describing the linear portion of the effect of intersymbol interference on an optically detected read signal from an optical disc, said intersymbol linear transfer function being convolved with a write signal to produce a linearly transformed portion of the optically detected read signal determining an inverse linear transfer function of the intersymbol linear transfer function, said inverse linear transfer function having the property of canceling the effect of convolving the intersymbol linear transfer function with the write signal;

dividing the inverse linear transfer function into a short portion and a long portion;

convolving the write signal with a precompensation transfer function, the precompensation transfer function being substantially the inverse of the long portion of the inverse linear transfer function; and convolving the optically detected read signal with the short portion of the inverse linear transfer function;

whereby the linear portion of the effect of intersymbol interference on an optically detected read signal from an optical disc is canceled.

17. A method as recited in claim 16 wherein convolving the optically detected read signal with the short portion of the inverse linear transfer function is performed using an analog circuit.

18. A method as recited in claim 16 wherein convolving the optically detected read signal with the short portion of the inverse linear transfer function is performed using an digital circuit.

19. A method as recited in claim 16 wherein the gain of the precompensation transfer function changes over its frequency range by a total of less than 20%.

20. A method as recited in claim 16 wherein the gain of the precompensation transfer function changes over its frequency range by a total of less than 10%.

21. A method as recited in claim 16 wherein the gain of the precompensation transfer function changes over its frequency range by a total of less than 5%.

22. A method of compensating for intersymbol interference on an optical disc comprising:

measuring an intersymbol nonlinear transfer function, said intersymbol nonlinear transfer function substantially describing the nonlinear portion of the effect of intersymbol interference on an optically detected read signal from an optical disc, said intersymbol nonlinear transfer function being nonlinearly convolved with a write signal to produce a nonlinearly transformed portion of the optically detected read signal determining an inverse nonlinear transfer function of the intersymbol nonlinear transfer function, said inverse nonlinear transfer function having the property of canceling the effect of nonlinearly convolving the intersymbol nonlinear transfer function with the write signal; and nonlinearly convolving the write signal with a precompensation transfer function, the precompensation transfer function being substantially the same as the inverse nonlinear transfer function;

whereby the nonlinear portion of the effect of intersymbol interference on an optically detected read signal from an optical disc is canceled.

23. A method as recited in claim 22 wherein determining an inverse nonlinear transfer function of the intersymbol nonlinear transfer function is accomplished by an iterative method.

24. A method as recited in claim 23 wherein the iterative method is substantially described by the following equations:

$$w^{(0)} = a^{-1}*r \quad (4)$$
$$w^{(1)} = a^{-1}*r + a^{-1} * (B \cdot w^{(0)})$$
$$\vdots$$
$$w^{(n)} = a^{-1}*r + a^{-1} * (B \cdot w^{(n-1)})$$
$$\text{until } w^{(n)} \approx w^{(n-1)}.$$

25. An optical disc data track precompensated for the effects of nonlinear intersymbol interference comprising:

a data track formed according to a write signal, the write signal being determined to precompensate for the effects of nonlinear intersymbol interference, the effects of nonlinear intersymbol interference being substantially described by an intersymbol nonlinear transfer function, said intersymbol nonlinear transfer function being nonlinearly convolved with a write signal to produce a nonlinearly transformed portion of the optically detected read signal; the precompensation being substantially performed by nonlinearly convolving an inverse nonlinear transfer function of the intersymbol nonlinear transfer function, said inverse nonlinear transfer function having the property of canceling the effect of nonlinearly convolving the intersymbol nonlinear transfer function with the write signal;

whereby the nonlinear portion of the effect of intersymbol interference on an optically detected read signal from an optical disc is canceled.

26. A method of compensating for intersymbol interference on an optical disc comprising:

creating a first pit having a first depth, said first depth corresponding to a digital data level stored at the location of the first pit; and creating a second pit having a second depth, said second depth corresponding to the same digital data level as the digital data level stored at the location of the first pit, wherein the difference between the first depth and the second depth precompensates for the difference between a first intersymbol interference between the first pit and neighboring pits that are located in the vicinity of the first pit and a second intersymbol interference between the second pit and neighboring pits that are located in the vicinity of the second pit;

whereby compensation is made for intersymbol interference.

27. A method as described in claim 26 wherein the difference between the first depth and the second depth precompensates for linear effects resulting from the difference between a first intersymbol interference between the first pit and neighboring pits that are located in the vicinity of the first pit and a second intersymbol interference between the second pit and neighboring pits that are located in the vicinity of the second pit.

28. A method as described in claim 26 wherein the difference between the first depth and the second depth precompensates for nonlinear effects resulting from the difference between a first intersymbol interference between the first pit and neighboring pits that are located in the vicinity of the first pit and a second intersymbol interference between the second pit and neighboring pits that are located in the vicinity of the second pit.

29. A method of compensating for intersymbol interference on an optical disc comprising:

measuring an intersymbol nonlinear transfer function, said intersymbol nonlinear transfer function substantially describing the nonlinear portion of the effect of intersymbol interference on an optically detected read signal from an optical disc, said intersymbol nonlinear transfer function being nonlinearly convolved with a write signal to produce a nonlinearly transformed portion of the optically detected read signal determining an inverse nonlinear transfer function of the intersymbol nonlinear transfer function, said inverse nonlinear transfer function having the property of canceling the effect of nonlinearly convolving the intersymbol nonlinear transfer function with the write signal; and dividing the inverse nonlinear transfer function into a first portion and a second portion; and nonlinearly convolving the write signal with a precompensation transfer function, the precompensation transfer function being substantially the inverse of the first portion of the inverse nonlinear transfer function; and nonlinearly convolving the optically detected read signal with the second portion of the inverse nonlinear transfer function;

whereby the nonlinear portion of the effect of intersymbol interference on an optically detected read signal from an optical disc is canceled.

30. A method of compensating for intersymbol interference on an optical disc comprising:

measuring an intersymbol nonlinear transfer function, said intersymbol nonlinear transfer function substantially describing the nonlinear portion of the effect of intersymbol interference on an optically detected read signal from an optical disc, said intersymbol nonlinear transfer function being nonlinearly convolved with a write signal to produce a nonlinearly transformed portion of the optically detected read signal determining an inverse nonlinear transfer function of the intersymbol nonlinear transfer function, said inverse nonlinear transfer function having the property of canceling the effect of nonlinearly convolving the intersymbol nonlinear transfer function with the write signal; and nonlinearly convolving the optically detected read signal with the inverse nonlinear transfer function;

whereby the nonlinear portion of the effect of intersymbol interference on an optically detected read signal from an optical disc is canceled.

31. A method of compensating for intersymbol interference on an optical disc comprising:

measuring an intersymbol linear transfer function, said intersymbol linear transfer function substantially describing the linear portion of the effect of intersymbol interference on an optically detected read signal from an optical disc, said intersymbol linear transfer function being convolved with a write signal to produce a transformed portion of the optically detected read signal;

determining an inverse linear transfer function of the intersymbol linear transfer function, said inverse linear transfer function having the property of canceling the effect of convolving the intersymbol nonlinear transfer function with the write signal; and linearly convolving the write signal with a precompensation transfer function, the precompensation transfer function being substantially the same as the inverse linear transfer function;

whereby the linear portion of the effect of intersymbol interference on an optically detected read signal from an optical disc is canceled.

* * * * *

UNITED STATES PATENT AND TRADEMARK OFFICE
CERTIFICATE OF CORRECTION

PATENT NO. : 5,818,806
DATED : October 6, 1998
INVENTOR(S) : WONG et al.

It is certified that error appears in the above-identified patent and that said Letters Patent is hereby corrected as shown below:

Column 1, line 4, "This invention was made with United States Government support under cooperative agreement number 70NANB5H1087 awarded by NIST. The United States Government has certain rights in this invention."

Signed and Sealed this

Eighth Day of June, 1999

*Attest:*

Q. TODD DICKINSON

*Attesting Officer*   *Acting Commissioner of Patents and Trademarks*